United States Patent [19]

Fish, III et al.

[11] Patent Number: 4,524,242

[45] Date of Patent: Jun. 18, 1985

[54] LOW-COST ELECTRONIC MAIL TERMINAL

[75] Inventors: Russell Fish, III, Mountain View; James R. Yurchenco, Palo Alto, both of Calif.

[73] Assignee: Post Technologies, Inc., Menlo Park, Calif.

[21] Appl. No.: 465,040

[22] Filed: Feb. 8, 1983

[51] Int. Cl.$^3$ .............................................. H04L 21/00
[52] U.S. Cl. ..................................... 178/4; 178/17 A; 178/17.5
[58] Field of Search ................... 178/4, 3, 15, 30, 17.5, 178/17 A, 23 R; 364/900; 340/750, 748, 744

[56] References Cited

U.S. PATENT DOCUMENTS

| | | | |
|---|---|---|---|
| 4,016,365 | 4/1977 | Staar | 178/17.5 |
| 4,435,777 | 3/1984 | McCaskill et al. | 340/750 |
| 4,439,761 | 3/1984 | Fleming et al. | 340/748 |

Primary Examiner—Stafford D. Schreyer
Attorney, Agent, or Firm—Hamrick, Hoffman, Guillot & Kazubowski

[57] ABSTRACT

An electronic mail terminal 10 that includes a keyboard 12, multi-character display 14, thermal printer 22, tape drive 118, and communication and control circuitry. The tape drive and printer mount to molded-in features of a base housing 20. A printed circuit board 28 containing the communication and control circuitry and the display is mounted to molded-in features of the base housing. The keyboard plugs into the printed circuit board from above and is supported at the sides by standoffs in the base housing. A cover housing 88 mates with molded-in features of the base housing. The tape drive mechanism includes cassette guides 98 and 376 that are molded into the base and cover housings and a spring loaded motor mount that automatically compensates for wear and positioning tolerances. A printer carriage motor 184 drives a toothed belt 182 to position a carriage 138 which holds a thermal print head 140. An optical encoder 146 and a mechanical switch 194 provide position feedback of carriage position to the control circuitry. A paper advance motor 256 advances the paper through a worm gear train 256, 262 with position feedback provided by a mechanical switch 280. The printer carriage is a molded plastic runner to which the toothed belt and the thermal print head attaches. A metal clip 340 provides an easily removable mounting for the print head.

10 Claims, 16 Drawing Figures

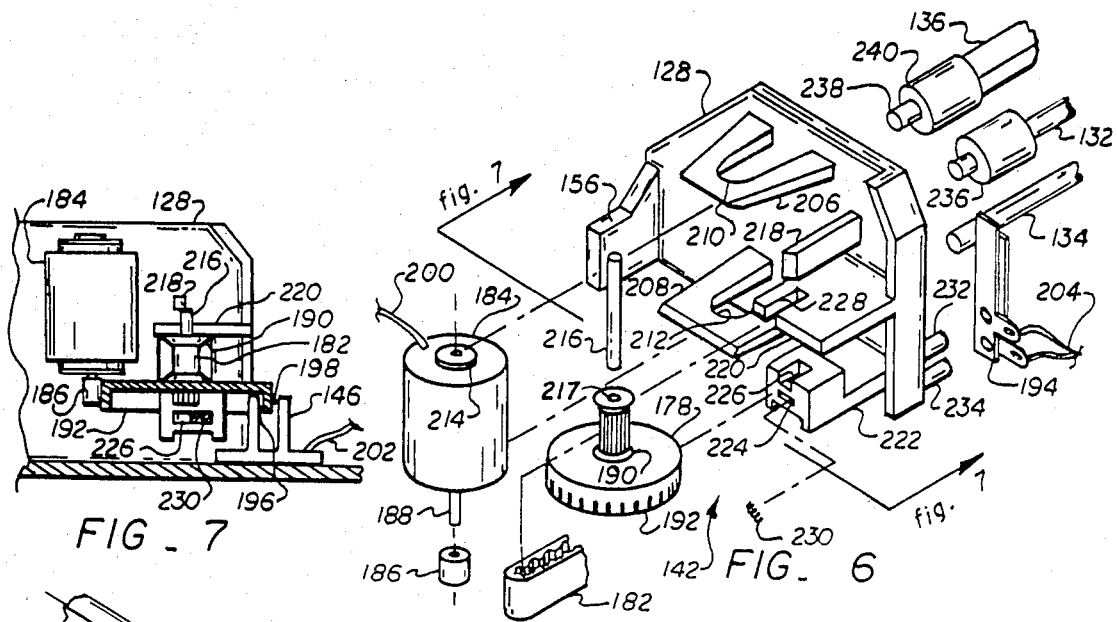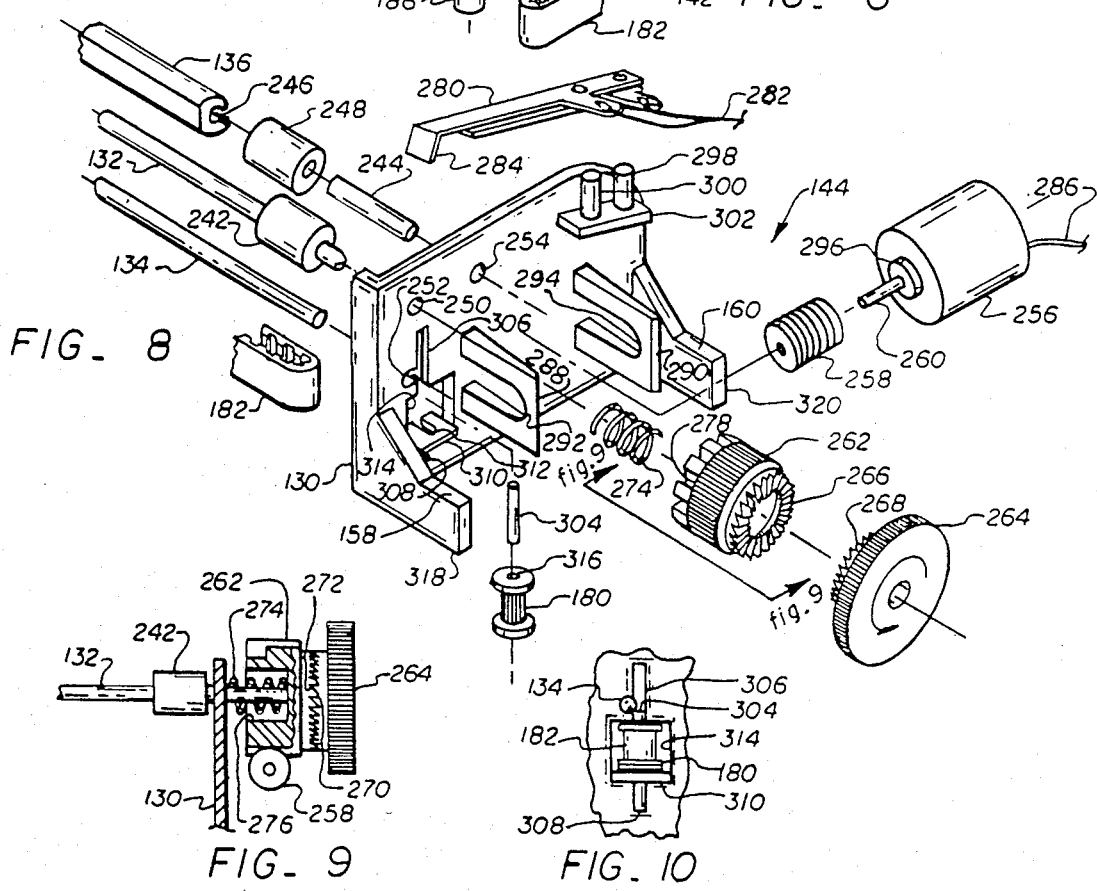

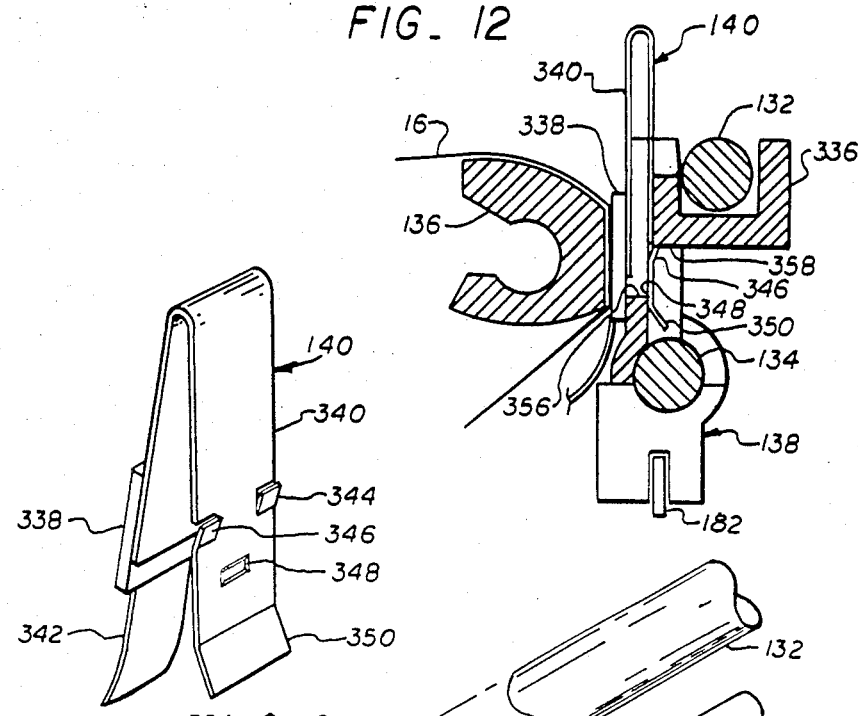
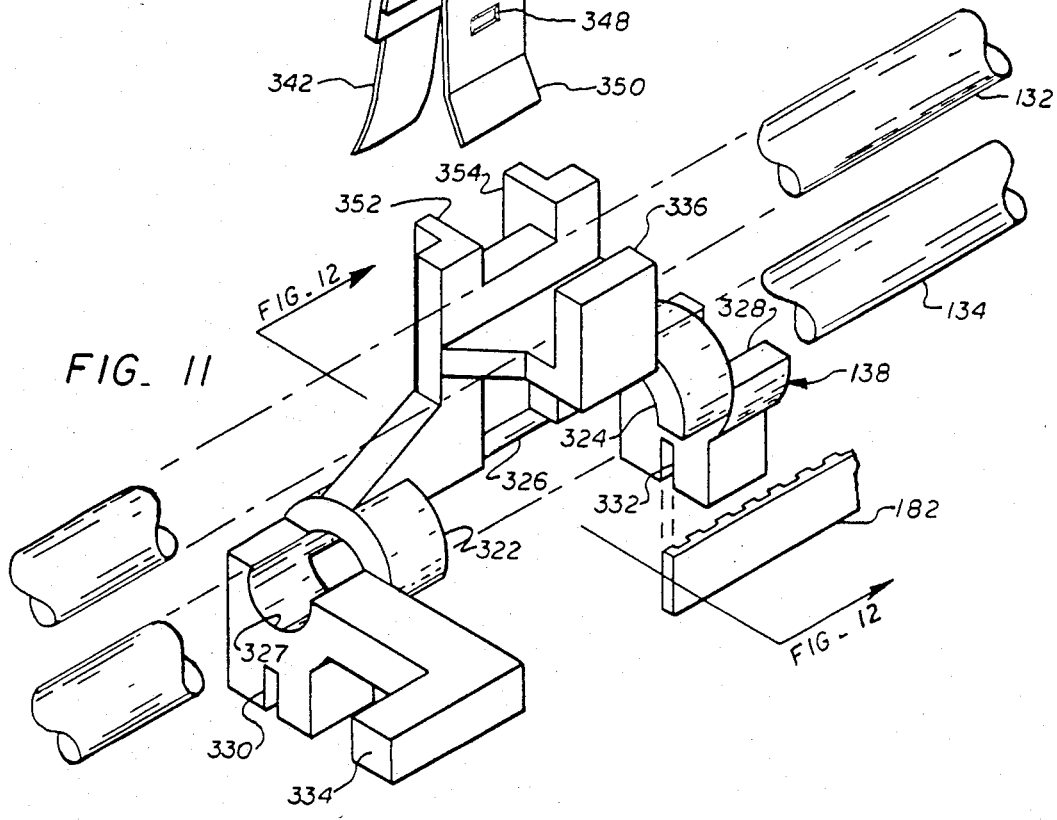

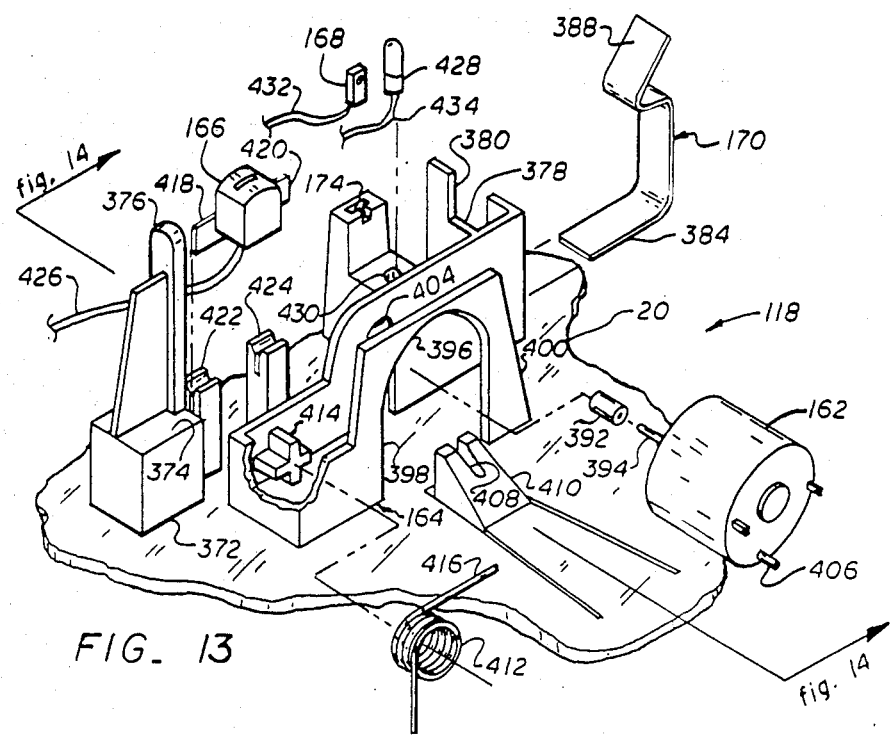
FIG. 13
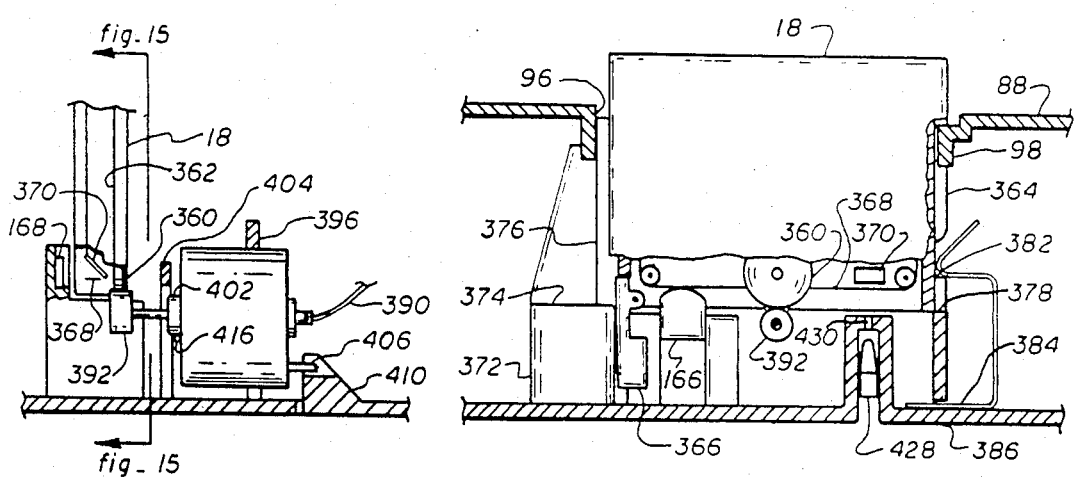
FIG. 14
FIG. 15

LOW-COST ELECTRONIC MAIL TERMINAL

BACKGROUND OF THE INVENTION

1. Field of the Invention

The present invention relates generally to computers suitable for use as electronic mail terminals and more particularly to a computer having a printer, tape drive, keyboard, character display, and modem all conveniently and inexpensively packaged within a single housing.

2. Description of the Prior Art

Electronic mail involves the communication of printed messages from point to point using telephone lines. Advantages of electronic mail over our existing postal service include delivery speed and reliability. Since electronic mail provides a printed copy, accuracy and accountability of messages is superior to oral messages transmitted via telephones. Telex and TWX communication services are examples of currently available forms of electronic mail.

One promising version of an electronic mail network would include a computer-based terminal connected to standard telephone lines for each user in the network. Such a terminal would functionally include means for entering, editing, storing, and transmitting outgoing messages, and means for receiving and storing incoming messages.

More specifically, an electronic mail terminal for use with the above described network would essentially be a self-contained microcomputer that is optimized for message communication. It would be built around a microprocessor that is programmed to function as a message processor. Included would be a keyboard for the manual entry and editing of messages, a character display for the viewing of text, a printer for supplying a hard copy of messages, a non-volatile memory for message storage, and a modem for interfacing to a telephone line.

Many micro-computers have existed with sufficient hardware to enable them to function as electronic mail terminals. However, these microcomputers were more powerful and flexible than was necessary and as a result were too expensive to be used solely as an electronic mail terminal. What is needed, therefore, is an electronic mail terminal that is designed and built specifically for message communication. What is further needed is an electronic mail terminal that is low in cost and small in size to improve user convenience and to promote the popularity of electronic mail.

SUMMARY OF THE PRESENT INVENTION

It is therefore a principal object of the present invention to provide a novel and low cost electronic mail terminal.

Another object of the present invention is to provide an electronic mail terminal that includes a keyboard for message input, a printer for message printing, a non-volatile memory for message storage, a visual message display, communication circuity for telephone line interfacing, and computer circuitry to link and control the keyboard, printer, memory, and communication circuitry.

Still another object of the present invention is to provide an electronic mail terminal having all hardware contained within a single housing.

A further object of the present invention is to provide an electronic mail terminal having all computing and communication circuitry contained on one printed circuit board.

A further object of the present invention is to provide a low cost electronic mail terminal that is assembled with a minimal amount of labor by minimizing the use of mechanical fasteners and adjustments.

Another object of the present invention is to provide a low cost printer using direct current motors with position feedback sensors for positioning the print head and for advancing the paper.

Still another object of the present invention is to provide a thermal printer with an easily replaceable print head.

Still another object of the present invention is to provide a print head positioning mechanism and a tape drive mechanism having friction drives that compensate for wear.

These and other objects, which will hereinafter become apparent, are accomplished in accordance with the illustrated preferred embodiment of the present invention by providing an electronic mail terminal that includes a keyboard, a multi-character display, a thermal printer, a tape drive, and communication and control circuitry. In use, outgoing messages are input to the terminal via the keyboard, and are displayed for editing on either the display or the printer. After a message is edited, it may be transmitted to a telephone line through the communication circuitry or it may be stored on magnetic tape for later use. Incoming messages may be printed as they arrive.

In order to minimize manufacturing cost, the terminal utilizes many molded plastic structures and is assembled with few mechanical fasteners. The tape drive and printer mount to features that are molded into a base housing. A printed circuit board containing the communication and control circuitry and the display is mounted with the component side facing downward to additional molded-in features of the base housing. The keyboard plugs into the printed circuit board from above and is supported at the sides by stand-offs in the base housing. A cover housing completes the terminal assembly and covers the printer, tape drive, and keyboard by mating with still further molded-in features of the base housing.

The tape drive mechanism includes a direct current electric motor for winding a magnetic tape cassette, a read/write head for reading data from and recording data onto the magnetic tape, and an end-of-tape sensor for sensing the ends of the magnetic tape. Guides are molded into the base and cover housings to position the tapes cassette within the tape drive. A spring-loaded motor mount automatically compensates for wear in the winding mechanism and for tolerances in positioning the cassette.

The printer includes one direct current electric motor to position the printer carriage and another to advance the paper. The printer carriage motor drives a toothed belt to laterally position a thermal print head. An optical encoder and a mechanical switch provide position feedback to the control circuitry. The paper advance motor advances the paper through a worm gear train with position feedback provided by another mechanical switch.

The printer carriage is a molded plastic runner to which the toothed belt and the thermal print head attaches. A metal clip provides a mounting for the print head which permits easy removal for replacement.

Printing speed and reliability are enhanced by the low mass of the printer carriage.

Among the numerous advantages of the present invention is that it provides a low-cost alternative to the use of microcomputers as electronic mail terminals.

A further advantage of the present invention is that it is compact and light weight, while performing all of the functions necessary for an electronic mail terminal.

Another advantage of the present invention is that it is assembled with few mechanical fasteners.

A further advantage of the present invention is that no adjustments must be made in any of the mechanisms, thus the present invention can not fail through misalignment or misadjustment.

These and other objects and advantages of the present invention will no doubt become apparent to those skilled in the art after having read the following detailed description of the preferred embodiment which is illustrated in the several figures of the accompanying drawing.

IN THE DRAWING

FIG. 3 is a sectional view of the terminal of

Figure 1:
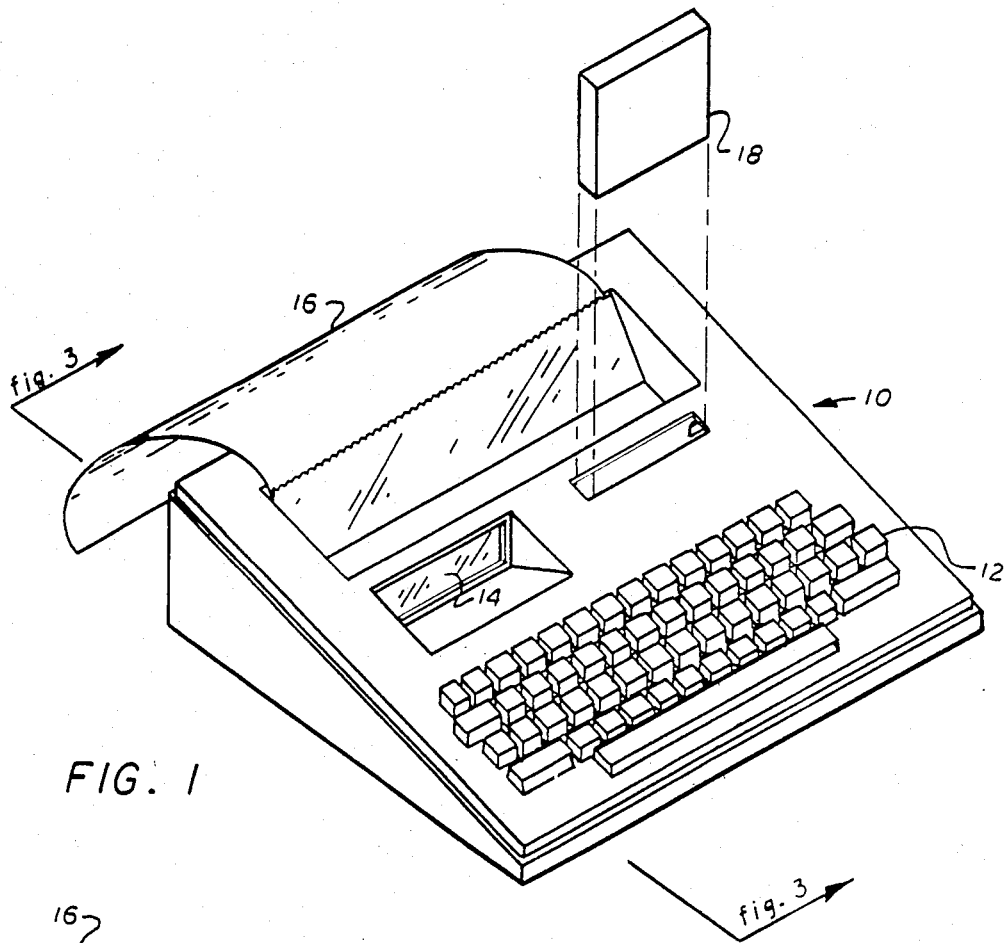
FIG. 1 is an isometric view of an electronic mail terminal according to the present invention.
Figure 5:
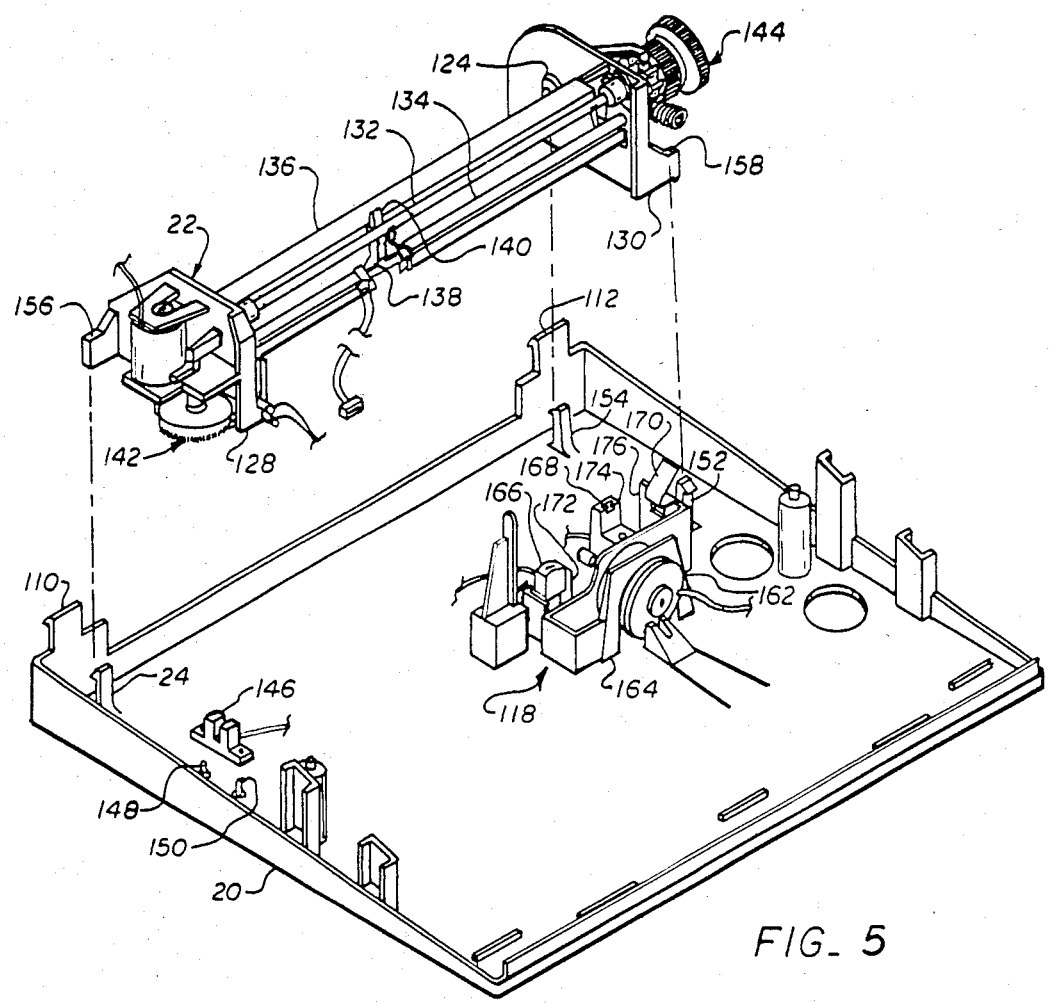
Figure 4:
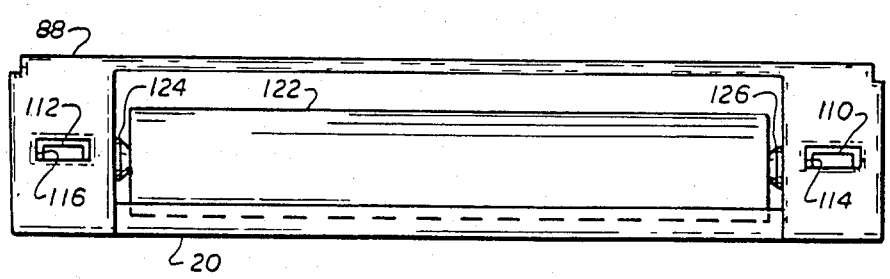
Figure 16:
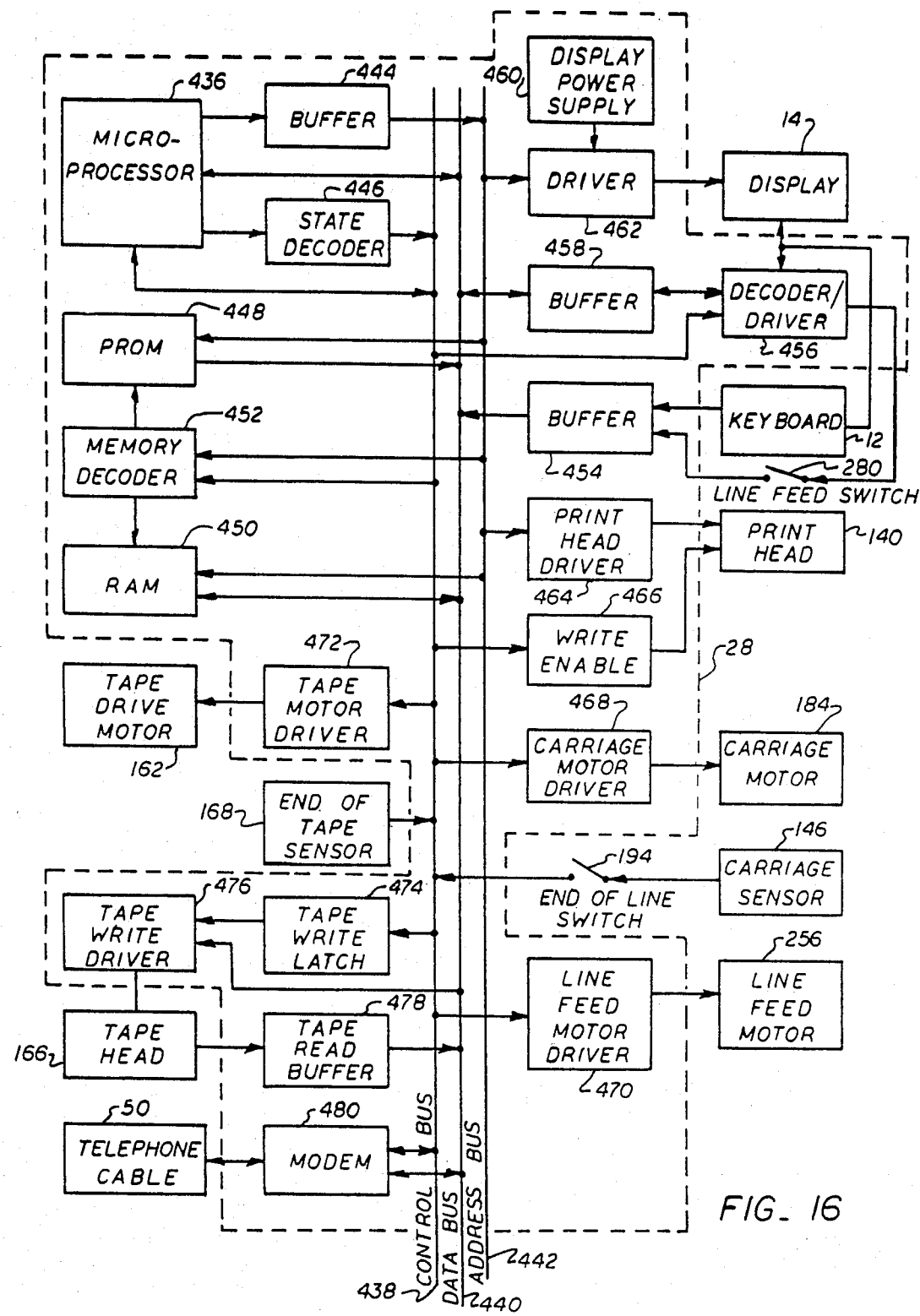

FIG. 1 as taken along the section line shown in FIG. 1;

FIG. 4 is a rear elevation view of the terminal of FIG. 1;

FIG. 5 is an exploded view in isometric perspective of the base subassembly of the terminal of FIG. 1. A printer mechanism and a tape drive mechanism are shown;

FIG. 6 is an exploded view in isometric perspective of the left side plate and printer head positioning mechanism of the printer mechanism of FIG. 5;

FIG. 7 is a sectional view of the printer head positioning mechanism of FIG. 6 as taken along the section line shown in FIG. 6;

FIG. 8 is an exploded view in isometric perspective of the right side plate and paper advance mechanism of the printer mechanism of FIG. 5. Note that the perspective viewpoint of FIG. 8 is from the upper right corner of the terminal of FIG. 1, while the perspective viewpoint of all other isometric views is from the upper left corner of the terminal;

FIG. 9 is a sectional view of a portion of the paper advance mechanism as taken along the section line shown in FIG. 8;

FIG. 10 is a side elevation view of a portion of the right side plate of the printer mechanism;

FIG. 11 is an exploded view in isometric perspective of a print head mechanism utilized in the printer mechanism of FIG. 5;

FIG. 12 is a sectional view of the print head mechanism as taken along the section line shown in FIG. 11;

FIG. 13 is an exploded view in isometric perspective of the tape drive mechanism of FIG. 5;

FIG. 14 is a side elevation sectional view of the tape drive mechanism as taken along the section line shown in FIG. 13;

FIG. 15 is a front elevation sectional view of the tape drive mechanism as taken along the section line shown in FIG. 14;

FIG. 16 is a functional block diagram of the computer and control circuits of the terminal of FIG. 1.

DETAILED DESCRIPTION OF THE PREFERRED EMBODIMENTS

Referring now to FIG. 1 of the drawing, the preferred embodiment of an electronic mail terminal, according to the present invention, is illustrated at 10. A keyboard 12 is provided for the manual entry of outgoing messages. Both outgoing and incoming messages may be displayed at a multi-character display 14 or printed onto paper 16. A tape cassette 18 serves as a non-volatile memory for storage and filing of messages when inserted into a tape drive located within the terminal.

Figure 2:
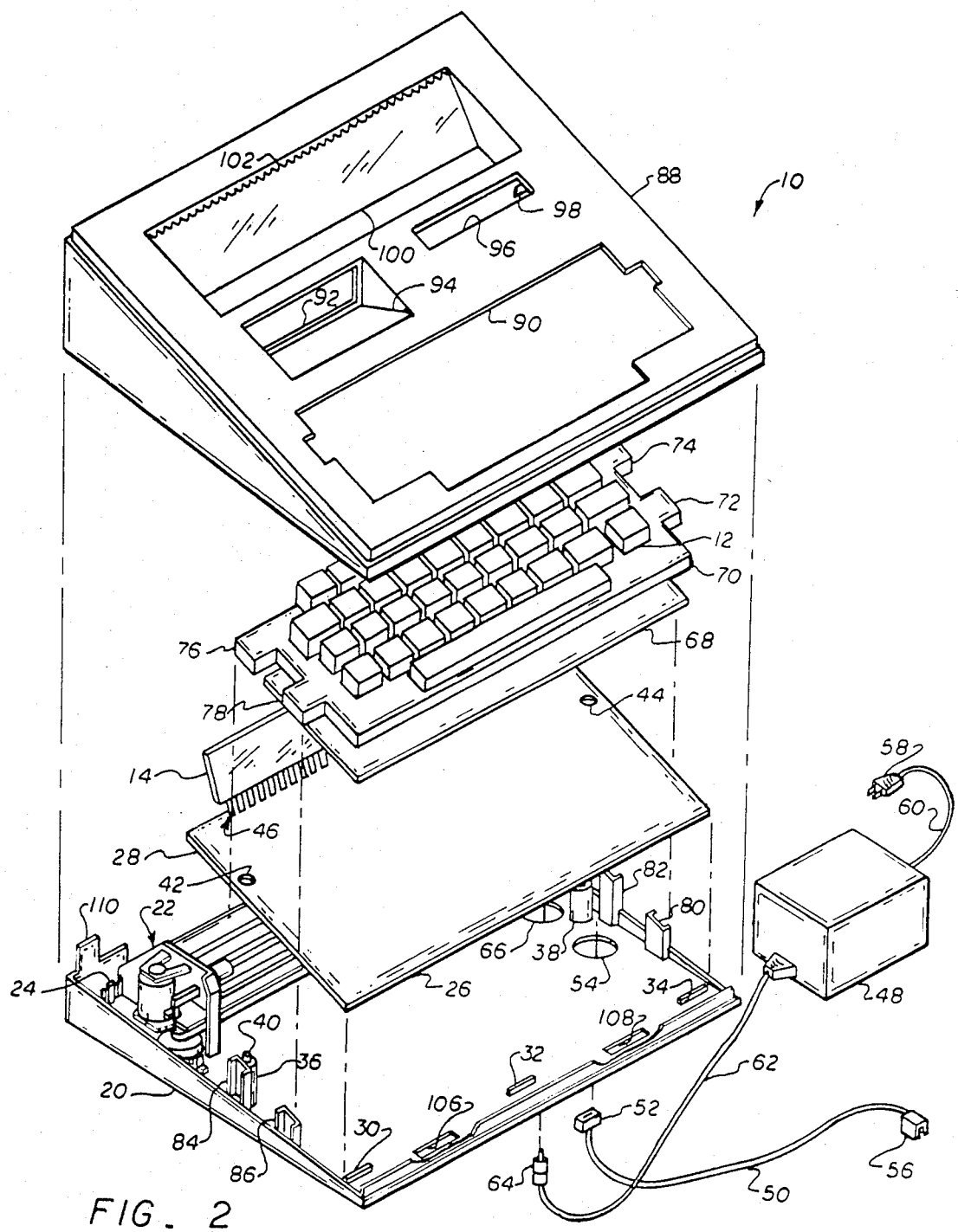
FIG. 2 is an exploded view in isometric perspective of the major subassemblies of the terminal of FIG. 1.

In the interest of minimizing manufacturing cost, a base housing 20 has molded-in features for the attachment of all sub-assemblies of the terminal 10, see FIG. 2. A thermal printer 22 is affixed to the left side of base housing 20 by a hook 24. As will be later described, the right side of the printer is affixed to the base housing in a similar manner.

The front edge 26 of a circuit board 28, which contains the communication, computer, and control circuitry, is positioned under tabs 30, 32 and 34 located across the front edge of the base housing. Two stand-offs 36 and 38, located along the sides of the base housing, support the sides of the circuit board. Pins 40 in the top of the stand-offs fit into corresponding holes 42 and 44 in the circuit board to provide lateral positioning for the circuit board. The circuit board is oriented with electronic components positioned on the bottom side. The multicharacter display 14 is supported by and is electrically coupled to the circuit board by a connector 46. Electrical connections from the circuit board to the printer 22 and to the tape drive are provided by cables which will be described below.

The terminal 10 is powered by an external power supply 48 and connects to a telephone network via a communication cable 50. Communication cable 50 has a connector 52 at one end which plugs into the circuit board 28 through an access hole 54, and a telephone type connector 56 at the other end which plugs into a telephone receptacle for connection to the telephone network. The external power supply 48 converts standard alternating current, which is input to the power supply via a standard electrical plug 58 and a cable 60, into low voltage direct current for powering the circuit board and other subassemblies. Direct current is input to the circuit board via a cable 62 and a connector 64 which plugs into the circuit board through an access hole 66. Advantages to using the external power supply rather than an internal power supply include reduced terminal size and reduced heat generation within the terminal.

To provide a compactly sized terminal 10, the keyboard 12 is positioned directly above the circuit board 28. A thin insulative sheet 68 serves to insulate the switches of the keyboard from the circuitry of the circuit board. The keyboard includes a base 70 of substantial rigidity with tabs 72, 74, 76 and 78 protruding from the sides. These tabs mate with stand-offs 80, 82, 84 and 86, respectively, which are molded into the base housing 20 to position and support the keyboard.

A cover housing 88 completes the terminal assembly by enclosing the subassemblies within. A keyboard opening 90 provides access to the keys of the keyboard 12. Visual access to the display 14 is gained through a display opening 92 located at the rear face of a depression 94. Access to the tape drive is through a cassette opening 96 which includes a right cassette guide 98 to aid in positioning the tape cassette 18. Paper 16 from the printer 22 is routed beneath a transparent bail 100, which includes teeth 102 for tearing the paper for removal.

Figure 3:
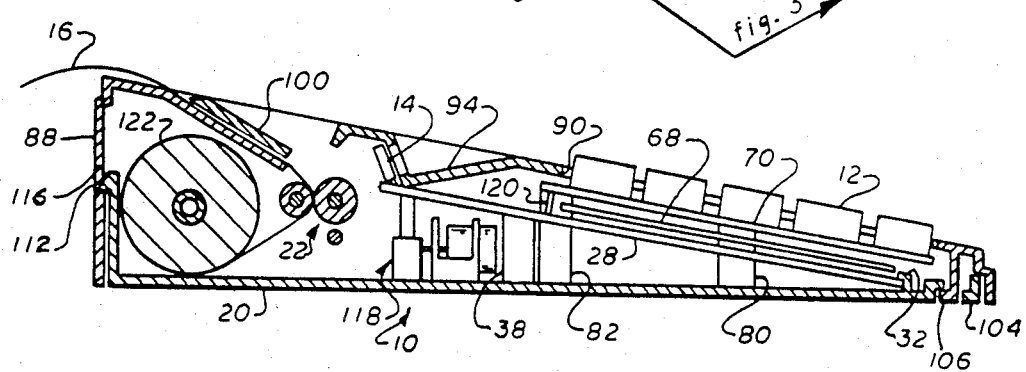

FIG. 3 illustrates the means for attaching the cover housing 88 to the base housing 20. Two front hooks 104 protrude downward from the front of the cover housing and mate with two front slots 106 and 108 in the front of the base housing. At the rear of the terminal 10, two rear hooks 110 and 112 protrude upward from the rear wall of the base housing. Rear hooks 110 and 112 mate with corresponding rear slots 114 and 116 in the rear wall of the cover housing to lock the rear portion of the housings and to pull the cover housing rearward to lock the front hooks into the front slots.

FIG. 3 also illustrates the relative positioning of the circuit board 28, keyboard 12, printer 22, and tape drive 118 within the terminal 10. Stand-off 38 and tab 32 incline the circuit board relative to the base housing. As a result, the larger sized electronic components are positioned toward the rear of the circuit board. The keyboard electrically connects to the circuit board through a connector 120. Stand-offs 80 and 82 incline the keyboard to the same degree as the circuit board. The means for mounting the printer and the tape drive will be described below.

The rear of the terminal 10 provides a space for a roll of paper 122 for use with the printer 22. FIG. 4 illustrates the access that is provided for the installation of the roll of paper. The rear walls of the cover and base housings 88 and 20 are relieved to permit the roll of paper to be installed on two nipples 124 and 126 that are part of the printer.

FIG. 5 illustrates the installation of the printer 22 and the tape drive 118 onto the base housing 20. The printer includes a left side plate 128 and a right side plate 130 with two shafts 132 and 134 and a platten 136 disposed therebetween. A carriage 138 with a print head 140 attached thereto is positioned along the shafts by carriage positioning means 142 that is mounted to the left side plate. Paper is advanced through the printer by paper advance means 144 that is mounted to the right side plate.

The printer 22 is assembled as a subassembly as shown in FIG. 5 before installation onto the base housing 20. A carriage position sensor 146 is first mounted onto posts 148 and 150 that protrude up from the base housing. Then the remainder of the printer is lowered into position. Hooks 24, 152, and 154 position and retain plates 128 and 130 by latching over flats 156, 158, and 160 (shown in FIG. 8).

The tape drive 118 is assembled by installing its various components onto the base housing 20, rather than forming a separate subassembly as the printer 22. A tape drive motor 162 is installed by inserting it into a motor mounting bracket 164. Similarly, a read/write head 166, a tape sensor 168, and a cassette retention spring 170 are installed by inserting them into their respective mounting brackets 172, 174, and 176.

Turning now to FIGS. 6 and 7, the carriage advance means 142 of the printer 22 will be described. A drive pulley 178 and an idler pulley 180 (FIG. 8) are rotatably attached to plates 128 and 130, respectively. A toothed belt 182 is looped around both pulleys and is affixed to the carriage 138 to couple the carriage to the drive pulley. The displacement of the carriage is thus coupled to rotation of the drive pulley. A carriage drive motor 184 having a drive roller 186 affixed to its shaft 188 provides the means for rotating the drive pulley. Drive pulley 178 is divided into a belt pulley 190 that serves as a pulley for the toothed belt and a drive wheel 192 of a larger diameter that contacts the drive roller.

The position of the carriage 138 is known to the control circuitry of the circuit board through the carriage position sensor 146 and an end-of-line switch 194. The drive wheel portion of the drive pulley has a circumferential lip with equally spaced radial slots. Rotation of the drive pulley is sensed by the carriage position sensor 146. Sensor 146 utilizes a light source 196 and a light detector 198 positioned on opposite sides of the lip to detect movement of the slots and, hence, rotation of the drive pulley. This arrangement provides carriage position feedback to the control circuitry, and as a result, an inexpensive direct current motor can be used rather than a more costly stepper motor while maintaining acceptable carriage positioning accuracy. The end-of-line switch is activated by the carriage when it is positioned at the far left side of the printer. This provides a reference point from which the position of the carriage is computed by the control circuitry according to the drive pulley rotation detected by sensor 146. The carriage drive motor 184, the carriage position sensor 146, and the end-of-line switch 194 are respectively connected to the control circuitry on the circuit board by cables 200, 202, and 204.

The left side plate 128 provides means for mounting the carriage positioning means 142 described above. Plate 128 includes two brackets 206 and 208 for mounting motor 184. Brackets 206 and 208 project horizontally from the left side of plate 128 and are spaced apart by a distance equal to the length of the motor. The brackets have openings 210 and 212 that are sized to accept flanges 214 of the motor. To install the motor, the ends of the brackets are first deflected apart. Then the shaft end of the motor is inserted into the lower opening 212 and flange 214 is inserted into the upper opening 210. When the brackets are released, they return to their horizontal positions and the motor installation is complete.

The left side plate 128 provides means for mounting the drive pulley 178 so that any wear in the drive roller 186 or the drive wheel 192 is automatically compensated for to ensure proper contact therebetween. A dowel pin 216 inserted into an axial hole 217 in the drive pulley provides an axis for the drive pulley to rotate. Mounting means for the dowel pin and the drive pulley includes upper, central, and lower pulley brackets 218, 220, and 222, which project horizontally from the left side of the plate. The lower pulley bracket 222 has a slotted recess 224 open to the top and left side with a bar 226 disposed across the side opening. The slotted recess is dimensioned so that the dowel pin can be inserted from the top and can move toward and away from the motor 184, but can not move sideways. The central bracket 220 is positioned above the lower bracket by a distance equal to the height of the drive pulley. A slot 228 in the central bracket is positioned above the slotted recess and is open to the side. The width of slot 228 is equal to the diameter of the dowel pin. The upper bracket 218 is positioned above both the slotted recess and the slot.

To install the drive pulley, it is first placed between the central and lower brackets 220 and 222. A coil spring 230 is then inserted in the slotted recess to bias the bottom of the dowel pin toward the motor 184, thus preloading the drive wheel 192 toward the drive roller 186. As either the drive wheel or the drive roller wears, spring 230 acts to move the dowel pin to compensate for the wear.

Next, the upper bracket is deflected and the dowel pin 216 is inserted through the slot 228, the axial hole 217 of the drive pulley, and into the slotted recess 224 of the lower bracket. At this point, the top of the dowel pin is level with the underside of the upper bracket. When the upper bracket is released, it returns to its underflected position, thus retaining the top of the dowel pin. The orientation of the axis of rotation of the drive pulley and the motor are illustrated as being vertical, but other orientations that are perpendicular to the horizontally oriented shafts 132 and 134 would work equally as well.

Moving our attention to the right side of the left side plate 128, means for mounting the shafts 132 and 134, the platten 136, and the end-of-line switch 194 will now be described. Mounting for the switch is provided by two posts 232 and 234 to which the switch is adhesively bonded. Shaft 132 has a roller 236 affixed at the end thereof with a short length of the shaft protruding. Platten 136 has a dowel pin 238 inserted at the left end thereof which provides an axle upon which another roller 240 is free to rotate. The end of dowel pin 238, the protruding end of shaft 132, and the end of shaft 134 are mounted into holes (not shown) in the right side plate 128, permitting rollers 236 and 240 and shaft 132 to freely rotate.

The paper advance means 144 and the right side plate 130 of the printer 22 are illustrated in detail in FIGS. 8, 9 and 10. The shafts 132 and 134 and the platten 136 are mounted to the right side plate in a fashion similar to the left side. A roller 242 is affixed to the end of shaft 132 like roller 236 on the left side. Platten 136 has a dowel pin 244 inserted into the center 246 thereof, as on the left side, and a roller 248 is free to rotate on the dowel pin. Shafts 132 and 134 and platten 136 are mounted to plate 130 by insertion into holes 250, 252, and 254, respectively. Shaft 132 protrudes through hole 250 for coupling to the paper advance means.

Paper 16 is advanced through the printer 22 by causing shaft 132 to rotate. Paper from the roll of paper 122 is grasped along each edge by rollers 236 and 240 on the left and rollers 242 and 248 on the right. Since rollers 236 and 242 are affixed to shaft 132 and rollers 242 and 248 are free to rotate about their respective dowel pins 238 and 244, rotation of shaft 132 in a counterclockwise direction, as viewed in FIG. 8, advances the paper.

Two means for rotating shaft 132 are provided, one manual and one automatic. The automatic means employs a line feed motor 256 with a worm 258 affixed to its shaft 260 to drive a worm gear 262. The worm gear is coupled to shaft 132 through a thumb wheel 264 which is affixed to the end of shaft 132. The manual means employs only the thumb wheel to rotate shaft 132.

In order to couple the worm gear 262 to the thumb wheel 264 during automatic paper advance and to decouple them during manual paper advance, the worm gear operates as a clutch. The worm gear has radial teeth 266 equally spaced about its right face which mate with corresponding radial teeth 268 on the left face of the thumb wheel. The faces of the teeth are inclined so as to couple the thumb wheel to the worm gear when the worm gear rotates counterclockwise, while permitting the thumb wheel to rotate counterclockwise when the worm gear is stationary. When an automatic paper advance is desired, the motor 256 turns the worm 258 which rotates the worm gear. Axial faces 270 of the teeth 266 and 268 lock the thumb wheel to the worm gear so that both rotate counterclockwise, advancing the paper. However, when a manual paper advance is desired, inclined faces 272 of the teeth cause the worm gear to move left, compressing a spring 274. Spring 274 is disposed around shaft 132 within a cavity 276 in the worm gear and acts to bias the worm gear toward the thumb wheel. As the worm gear moves left, the thumb wheel is permitted to rotate counterclockwise. After the thumb wheel and shaft 132 has rotated an amount corresponding to the pitch of the teeth, the spring moves the worm gear to the right to its starting position, ready for either automatic or manual paper advance.

A feedback mechanism provides position information concerning the worm gear 262 to the control circuitry on the circuit board 28. The left side of the worm gear has notches 278 equally spaced about its periphery. The pitch between the notches corresponds to the degree of rotation of shaft 132 that is equivalent to advancing the paper 16 by one line. A line feed switch 280 is electrically coupled to the control circuitry via cable 282 and includes a follower 284 that follows the contours of the left side of the worm gear. The contours of the notches are such that the follower readily may follow without binding. When the worm gear is positioned such that the follower is in a notch, switch 280 is closed. When the worm gear is positioned such that the follower is not in a notch, the switch is open. In this manner, the control circuit can provide power to the line feed motor 256 through its cable 286 until the switch indicates that a line feed has been completed.

The right side plate 130 provides means for mounting the paper advance means 144 described above. Plate 130 includes two brackets 288 and 290 for mounting the line feed motor 256. Brackets 288 and 290 project from the right side of plate 130 and are spaced apart by a distance equal to the length of the motor 256. The brackets have openings 292 and 294 that are sized to accept flanges 296 of the motor 256. To install the motor, the ends of the brackets are first deflected apart. Then, the shaft end of the motor is inserted into the forward opening 292 and the rear end of the motor is inserted into the rear opening 294. When the brackets are released, they return to their undeflected positions and the motor installation is complete. The line feed switch 280 is mounted to the plate 130 by adhesively bonding it to two posts 298 and 300. Posts 298 and 300 are formed in a projection 302 out of the upper rear portion of the right side plate.

The idler pulley 180 is mounted to the right side plate 130 by a dowel pin 304 that is locked in place by shaft 134. Plate 130 includes upper and lower grooves 306 and 308, a shelf 310 with a horizontal slot 312 that is open to the left, and a clearance opening 314. To install the idler pulley, it is first placed on the shelf with its center hole 316 positioned over the slot. Next, the dowel pin is inserted into the center hole from above and is lowered through the slot until the bottom of the dowel pin reaches the bottom of the lower groove. At that point, the pulley is mounted with the upper and lower grooves counteracting any tensile force in the toothed belt 182. To finish the installation, shaft 134 is inserted into hole 252 to prevent the dowel pin from lifting.

The right side plate 130 is affixed to the base housing 20 by hooks 152 and 154 latched over flats 158 and 160, as described above. Flats 158 and 160 are horizontal surfaces in arms 318 and 320 which project horizontally to the right from plate 130. The arms act to give the right side plate a stable base for attachment to the base housing.

The carriage 138 and the print head 140 are illustrated in detail in FIGS. 11 and 12. The carriage has a left runner 322 and a right runner 324 which are both connected to a central body 326. The left and right runners 322 and 324 have contact surfaces 327 and 328 that encircle shaft 134 and couple the carriage thereto. Contact surfaces 327 and 328 are formed from connected concave surfaces that are alternately open above and below the carriage. This type of construction permits the carriage to be readily fabricated by a molding process. The left and right runners respectively have left and right slots 330 and 332 into which the ends of the toothed belt 182 are inserted. The toothed belt couples the carriage to the carriage positioning means 142. A finger 334 that protrudes to the left from the left runner actuates the end-of-line switch 194 when the carriage is positioned at the far left. The central body has a hook 336 formed therein that contacts shaft 132 to limit the rotation of the carriage about shaft 134.

The print head 140 is removably coupled to the central body 326 of the carriage and is operable for locally heating the thermal paper 16 to transfer characters thereto. Print head 140 includes an element 338 that is adhesively bonded to a clip 340 and is electrically coupled to the control circuitry on the circuit board 28 via a cable 342. Clip 340 is preferably fabricated from a thin strip of metal formed to a vee shape. The element is bonded to the rear facing leg of the vee. Mounting features are formed into the front facing leg which include tabs 344 and 346 that open to the top and face forward and a tab 348 that opens to the bottom and faces rearward. In addition, the bottom edge 350 of the front facing leg is angled forward.

To install the print head 140 into the carriage 138, the bottom edge 350 of the clip 340 is positioned above the carriage, the two legs of the clip are squeezed together, and then inserted into the groove formed by faces 352 and 354 of the central portion 326. As the clip is lowered, edge 350 deflects forward off of an internal shoulder 356. When fully inserted, tab 348 contacts shoulder 356 and tabs 344 and 346 lock the clip in position against another internal shoulder 358. In the installed position, the clip biases the element 338 toward the platen 136 to provide intimate contact with the paper 16 for good printing results. To remove the print head, the clip is squeezed and rotated rearward to release tabs 344 and 346 from shoulder 358, then lifted.

The installation and function of the tape drive 118 is shown in detail in FIGS. 13, 14 and 15. The tape drive consists of a tape drive motor 162, a tape head 166, an end-of-tape sensor 168 and cassette positioning means. Motor 162, head 166, and sensor 168 are mounted to various features that are molded into the base housing 20. This tape drive is adapted for use with tape cassettes 18 having a tape drive wheel 360 and an internal band for driving the tape reels, grooves 362 and 364 along two sides for positioning the cassette, a door 366 for protecting the magnetic tape 368, and a mirror 370 located behind the magnetic tape to aid in sensing the transparent leader tape at either end of the magnetic tape.

Cassette positioning is provided by various features of the base housing 20 and cover housing 88. A left support 372 molded into the base housing provides an insertion stop 374 and a left guide rail 376. The left guide rail acts to position the left groove 362 of the cassette 18 as well as open the door 366 when the cassette is inserted. The insertion stop 374 acts to limit the downward insertion of the cassette on the left side. The right cassette guide 98, attached to the cover housing, positions the right groove 364 of the cassette. Downward insertion of the right side of the cassette is limited by a notch 378 in a right support 380. The cassette is biased toward the left guide rail and the notch 378 by the cassette retention spring 170 which acts on a notch 382 in the cassette. Cassette retention spring 170 is preferably fabricated from a metal strip and is installed by sliding a foot portion 384 into an opening 386 in the right support 380. The cassette retention spring has an inclined surface 388 at the upper end thereof which is deflected by the cassette when inserted.

The tape drive motor 162 is electrically coupled to the control circuitry by a cable 390 and is operable for rotating the tape drive wheel 360 through a drive roller 392 affixed to the motor shaft 394. Motor 162 is pivotably mounted to the base housing 20 and biased toward the cassette 18 so as to automatically compensate for wear on drive roller 392 and for tolerances in the position of the cassette. The motor is retained by the motor mounting bracket 164 which consists of an arch 396 having a radius equal to that of the motor and two legs 398 and 400 that span the motor. A front flange 402 of the motor is similarly retained by another bracket 404 located rearward of bracket 164. A tab 406 affixed to the front of the motor is retained by a notch 408 in a motor support 410 to prevent motor rotation. The motor support is operable for recessing into the base housing to permit the motor to be installed into brackets 164 and 404. A rotary coil spring 412 is mounted to the base housing on a spring mount 414. One arm 416 of the spring 412 is positioned under flange 402 to provide the biasing force to preload the drive roller 392 against the tape drive wheel 360. When the cassette is withdrawn, the motor shaft 394 pivots upward until the flange contacts the bracket 404.

The tape head 166 is provided to magnetically record messages onto the magnetic tape 368 of the cassette 18 and to playback previously recorded messages. Two tabs 418 and 420 on the tape head slip into slots in two stand-offs 422 and 424 to provide a mounting for the tape head. A cable 426 electrically couples the tape head to the control circuitry.

The control circuitry must know when the end of the magnetic tape 368 is reached to a winding operation to prevent damage to the cassette 18. To accomplish this, a light source 428 and an aperture 430 are provided below and adjacent to the mirror 370 in the cassette and the light sensitive tape sensor 168 is positioned level with the adjacent to the mirror. The opaque magnetic tape prevents light from the light source from reaching the sensor when the magnetic tape is proximate the tape head 166. However, the transparent leader tape permits light from the light source to reach the mirror and reflect to the sensor, thereby indicating that the magnetic tape has been fully wound on a reel. The sensor and the light source are coupled to the control circuitry by cables 432 and 434.

FIG. 16 is a block diagram that depicts the functional operation of the electronic mail terminal 10 according to the preferred embodiment of the present invention. The bulk of the circuitry is contained on the circuit board 28. The operation of those components not located on the circuit board is described above.

The brain of the circuitry is a microprocessor 436 which functions as both a computer and as a controller. The circuitry is bus oriented with a control bus 438, a data bus 440, and an address bus 442. The microprocessor interfaces to the address bus through a buffer 444, interfaces to the control bus both directly and through a state decoder 446, and interfaces directly to the data bus. A programmble read only memory (PROM) 448 provides program storage, and a random access memory (RAM) 450 provides temporary storage of messages. Both PROM and the RAM are connected to the address bus and the data bus. The microprocessor accesses the memory through a memory decoder 452 that is connected to the control and address buses.

Messages are input to the terminal through the keyboard 12 which sends characters to the data bus 440 through a buffer 454. The keyboard is also connected to a decoder/driver 456 for displaying characters on the multi-character display as they are typed on the keyboard. Characters from the data bus through a buffer 458 are also input to the decoder/driver for display. Input power 460 for the display is routed through a driver 462 that is connected to the address bus 442 to permit the selection of a variety of display modes.

Messages to be printed are transmitted to a print head driver 464 over the address bus 442. The carriage sensor 146 and the end-of-line switch 194 are connected in series to the control bus 438 and act to disable the write enable circuit 466 if the carriage is not properly positioned. The print head 140 requires both an enable signal from the write enable circuit and a print signal from the print head driver before it prints. During the printing routine, a carriage motor driver 468 which is connected to the control bus directs the carriage motor 184 to properly position the carriage 138 for printing. When a line feed is required, a line feed motor driver circuit 470 powers the line feed motor 256 until the line feed switch 280 indicates completion.

Messages to be kept are stored on magnetic tape by the tape driver. When a message is to be stored, a tape motor driver 472, which is directed by the control bus 438, powers the tape drive motor 162 until the tape is properly positioned. Then a tape write latch 474, which is connected to the control bus, enables a tape write driver 476 to transfer data from the data bus 440 to the tape head 166 for recording. Data to be read from the magnetic tape is read by the tape head and transferred through a tape read buffer 478 to the data bus. The end-of-tape sensor 168 is connected to the control bus to prevent the tape driver motor from over winding the cassette.

All outgoing messages are output to the telephone cable 50 through a modem 480 of conventional design. Control signals from the control bus 438 determine destination and transmission rate, while the actual data to be transmitted comes from the data bus 440. Incoming messages enter the terminal 10 through the modem and the data bus.

Although the present invention has been described above in terms of a preferred embodiment specifically designed as an electronic mail terminal, it will be understood that the system or various parts thereof could be adapted for other applications. Accordingly, it is Applicants' intent that the appended claims be interpreted as covering all such alternations, modifications or other applications as fall within the true scope of the invention.

What is claim is:

1. An electronic mail terminal for point-to-point communication of messages by utilizing a standard telephone network, said terminal comprising:

a base housing including circuit board mounting means, printer mounting means, tape drive mounting means, keyboard mounting means, and cover mounting means;

a circuit board mounted to the front portion of said base housing by said circuit board mounting means, said circuit board including communication circuitry for interfacing with said telephone network, and with computer circuitry, and control circuitry;

means for electrically coupling said printed circuit board to said telephone network;

electrical power supply means coupled to said circuit board for converting standard alternating current power to low voltage direct current power for said terminal;

a printer affixed to said base housing with said printer mounting means and electrically coupled to said circuit board, said printer operable for printing messages;

a tape drive affixed to said base housing with said tape drive mounting means and electrically coupled to said circuit board, said tape drive operable for recording messages onto and reading messages from a tape cassette;

display means affixed and electrically coupled to said printed circuit board and mounted to said base housing by said keyboard mounting means, a keyboard operable for inputing messages; and a cover housing affixed to said base housing.

2. A terminal as recited in claim 1 wherein said circuit board mounting means includes tabs at the front end of said base housing and circuit board posts dispersed along the sides of said base housing, and wherein the front of said circuit board is mounted under said tabs.

3. A terminal as recited in claim 2 wherein said circuit board has electronic components on the bottom side thereof and said display means is affixed to the top side thereof.

4. A terminal as recited in claim 2 wherein said printer includes a left plate and a right plate and wherein said printer mounting means includes hooks for retaining said left and right plates.

5. A terminal as recited in claim 2 wherein said printer includes a thermal print head, carriage positioning means with a first motor, a first switch, and a sensor, and paper advance means with a second motor and a second switch, all electrically coupled to said control circuitry, and where said control circuitry is operable for instructing said printer to print messages.

6. A terminal as recited in claim 2 wherein said tape drive includes a cassette retention spring, a tape driver motor, a read/write head, and a tape sensor, and wherein said tape drive mounting means includes a cassette guide rail for positioning a tape cassette, means for mounting said spring, means for pivotably mounting said tape drive motor, means for mounting said read/write head, and means for mounting said tape sensor.

7. A terminal as recited in claim 2 wherein said keyboard mounting means has keyboard posts dispersed along the sides of said base housing and wherein said keyboard includes tabs positioned along the sides thereof for resting upon said keyboard posts, thus supporting said keyboard.

8. A terminal as recited in claim 2 wherein said cover housing includes an opening for the keys of said keyboard, a cassette opening to allow the insertion of a tape cassette into said tape drive, a cassette guide rail on one side of said cassette opening to position said cassette, an opening to permit viewing of said display, and a paper bail with teeth across the top edge to permit printer paper to be torn off.

9. A terminal as recited in claim 2 wherein said cover mounting means includes front slots in the front of said base housing and rear hooks at the rear of said housing, and wherein said cover housing includes front hooks at the front of said cover housing disposed for mating with said front slots, and also includes rear slots at the rear of said cover housing disposed for mating with said rear hooks.

10. A terminal as recited in claim 9 wherein said base and cover housings are fabricated by a molding process and said slots and hooks and mounting means are integral portions of said base and cover housings.

* * * * *